United States Patent Office 3,408,900
Patented Nov. 5, 1968

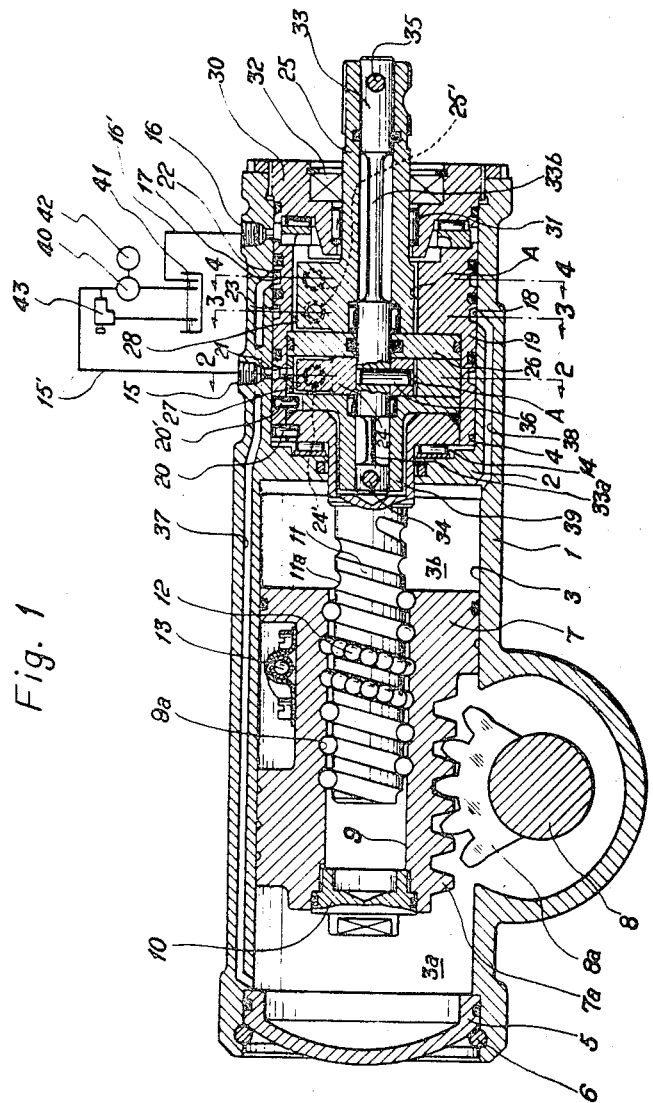

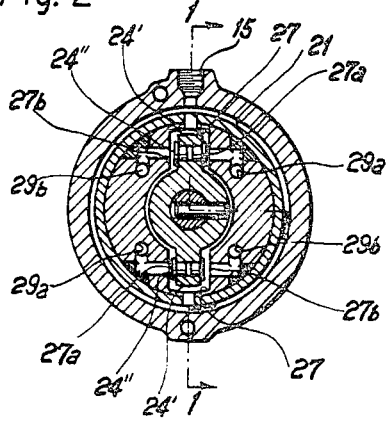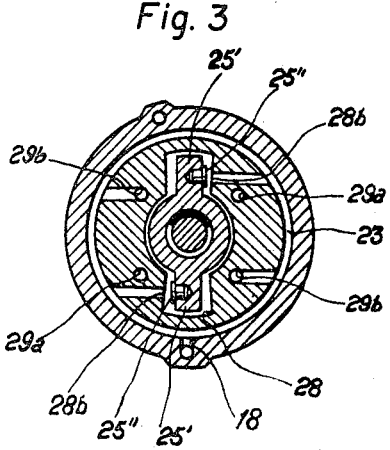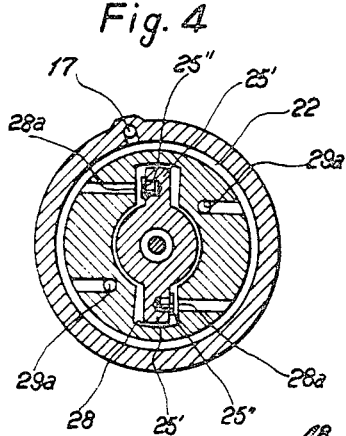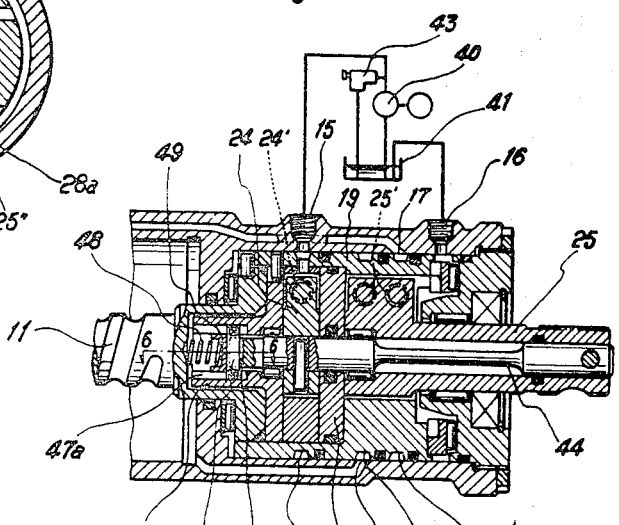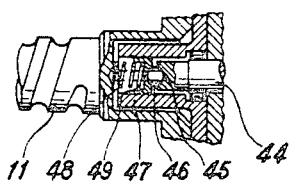

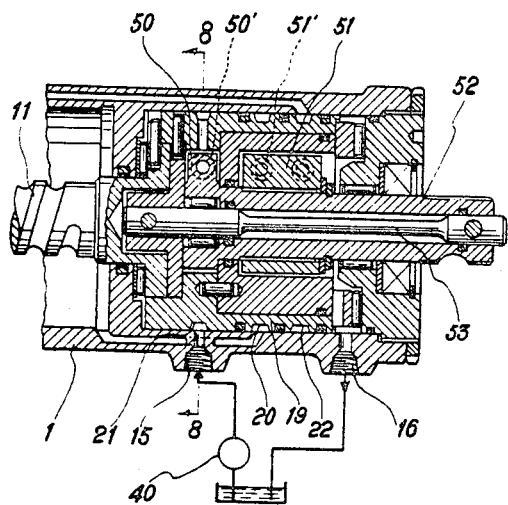
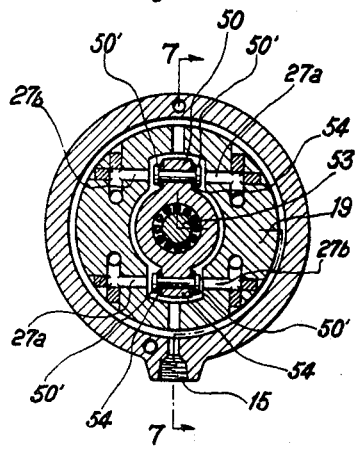
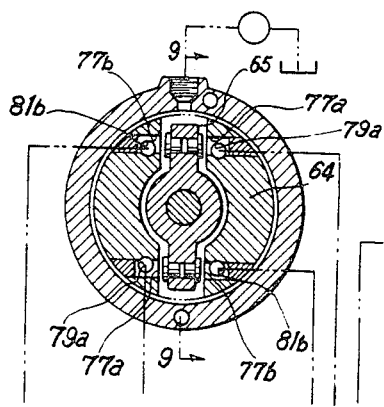
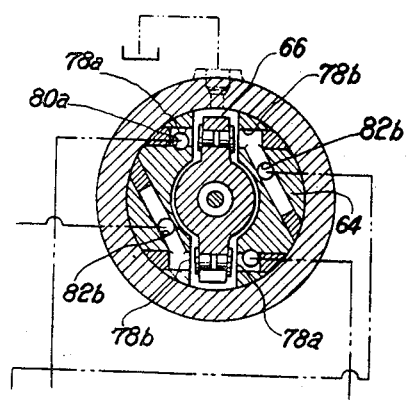
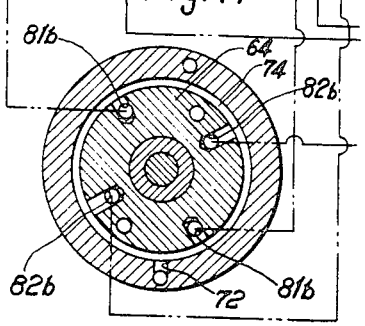
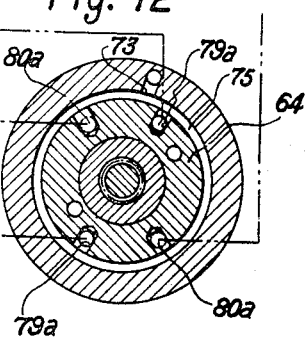

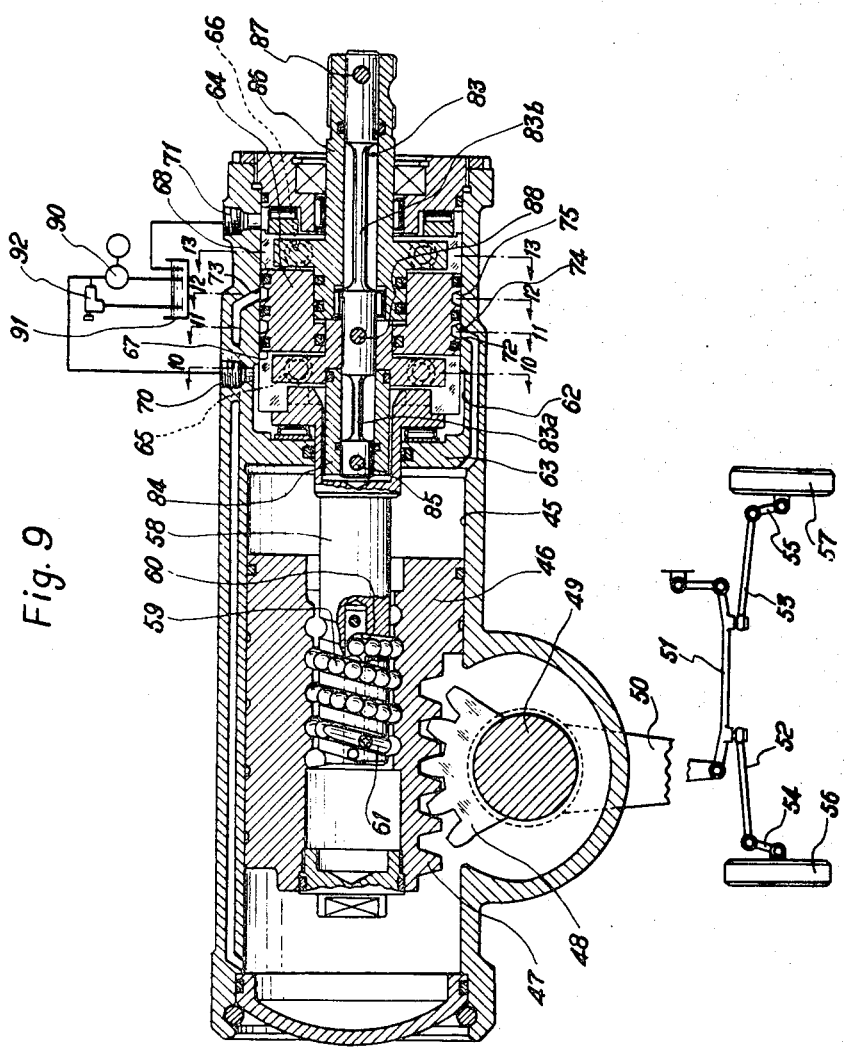

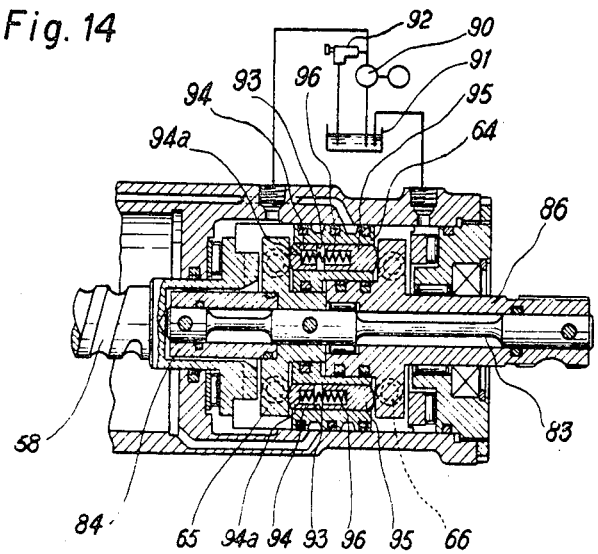

3,408,900
SERVO VALVE DEVICE IN POWER STEERING
GEAR OF AUTOMOBILE
Tamaki Tomita, Okazaki, Japan, assignor to Toyoda
Machine Works, Ltd., Kariya, Aichi Prefecture,
Japan
Filed Aug. 31, 1966, Ser. No. 576,441
Claims priority, application Japan, Sept. 2, 1965,
40/53,822; Apr. 2, 1966, 41/20,852
6 Claims. (Cl. 91—372)

ABSTRACT OF THE DISCLOSURE

A servo valve device in a power steering unit of an automobile having a fluid pressure motor to supplement manual steering and a steering rod member composed of two parts flexibly connected and coupled to the fluid pressure motor. A main valve member is connected with one of the steering rod members and is provided with a pair of opposite located injection ports connected with two operative ports of said fluid pressure motor, and a flap valve member is connected with the other of the two steering rod members and adapted for control of the flow resistance of said injection ports, such that the flow resistance of one of said injection ports is restricted and the other injection port is released to exhaust passage by the rotational phase difference of the two valve members by the action of manual steering effect, and thereby a circulating passage of operative fluid entering into one of the operative ports of said fluid pressure motor and leaving the other operative port thereof to fluid reservoir is completed.

---

The present invention relates to a servo valve device for controlling a fluid pressure motor in the power steering gear of an automobile.

The principal object of the present invention is to provide a new valve device, wherein two members related to the steering wheel are combined with resilient member, and two flap valves are operated by relative rotational phase difference of said two members, whereby the pressure oil circuit of the fluid pressure motor which serves to increase steering power is controlled. One of said two flap valves is characterized in that by acting against the flowing direction of the controlled fluid, the other of said two flap valves receives the reaction from said controlled flowing fluid, and said reaction on the other of said two flap valves is utilized as a suitable steering reaction proportional to the steering angle. Moreover, by this valve device, a high sensitive valve mechanism is obtained which responds instantaneously to the requirements of the fluid pressure motor.

In the control-valve device of a conventional power steering gear, a control slide valve device comprising two valve members relatively slidable is used. Such a slide valve device is constructed so as to assure a flow of high pressure fluid circulating from its inlet, through one of two operative ports of the fluid pressure motor and another operative port, to its exhaust. In this construction, two types of valve are utilized, one being a spool type wherein one of two relatively inserted valve members is adapted to slide axially for delivering pressure fluid, and another being a rotary type wherein one of two relatively rotatable valve members is adapted to rotate for delivering pressure fluid. In both types, the two valve members are so arranged that one valve member is provided with a number of grooves which are to be engaged variably with the grooves or openings machined in another valve member, and the above-mentioned circulation of pressure fluid is assured at any relative positions of said two valve members in their relative axial or rotary movements. Accordingly, several grooves on each valve member must be simultaneously engaged, which requires very precise machining on each valve member, only the slightest machining allowance being permitted. Thus, the machining itself becomes quite difficult, and as a result of machining errors, the sensibility of these conventional valve devices is quite low, in particular, for small displacements of the valve members. The output of the fluid pressure motor becomes discontinuous in the course of its variation from zero to maximum, which necessitates a specific magnifying device of displacement. Moreover, in the steering gear, for security of steering, it is required to obtain a sufficient steering reaction proportional to steering angle. Whereas, in such slide valve device as above-mentioned, no resistance is generated in the valve itself against its displacement. Accordingly, it is necessary to provide such slide valve device with additional steering reaction mechanism generating a resistance proportional to steering angle.

According to the present invention, the flap valve, acting against the flow direction of the pressure fluid, controls variably the flow resistance to the fluid going to its exhaust circuit, whereby the pressure of the pressure fluid supplied to the operative ports of the fluid pressure motor is controlled. Also, the flap valve member works as a flow-control valve which controls the flow resistance of the injection ports. There is no need of relative sliding motion of the flap valve member to the main valve member at the control working part. The effective control is obtained only by the approaching action of the valve surface. Thus, without necessity of such a precise machining as machining of variably engaging grooves in the conventional slide valve of this kind, and due to its simple construction, the manufacture of the valve device by the present invention is advantageous. Moreover, as the flow resistance is controlled by the approaching motion of two surfaces of the opening surface of the injection port and the engaging surface of the flap valve, a sensitive response is obtained from slight relative phase difference of both valve members, and thereby the following-sensitivity of the fluid pressure motor is elevated and the discontinuity of output thereof is avoided.

Moreover, as controlled pressure of the fluid pressure motor appears at the injection ports controlled by the flap valve, the fluid pressure due to the flow at the injection port acts on the flap valve as a direct couple. This fluid pressure is proportional to the controlled pressure of the fluid pressure motor, and is perceived by the operator as a suitable steering reaction according to the steering angle, whereby the stability of steering during the running time of automobile is elevated.

In the following, the present invention will be described in detail in connection with the accompanying drawings, in which:

FIG. 1 shows a longitudinal sectional view of a power steering gear wherein an example of the servo valve device of the present invention is utilized;
FIG. 2 is a sectional view along the line 2—2 of FIG. 1;
FIG. 3 is a sectional view along the line 3—3 of FIG. 1;
FIG. 4 is a sectional view along the line 4—4 of FIG. 1;
FIG. 5 shows a longitudinal sectional view of another example of the servo valve device of the invention;
FIG. 6 is a partial sectional view along the line 6—6 of FIG. 5.
FIG. 7 shows a longitudinal sectional view of another example of the servo valve device of the invention;
FIG. 8 is a sectional view along the line 8—8 of FIG. 7;
FIG. 9 shows a longitudinal sectional view of a power steering gear wherein another improved example of the servo valve device of the invention is utilized, the connecting steering linkage being schematically shown;
FIGS. 10, 11, 12 and 13 are sectional views along the lines 10—10, 11—11, 12—12 and 13—13 of FIG. 9 respectively, the connections of respective valve conduits being shown by the chain lines;

FIG. 14 shows a longitudinal sectional view of a servo valve device by the invention, wherein a means of friction resistance is inserted between two valve members adapted to be relatively displaced rotationally each other;

Figure 15:
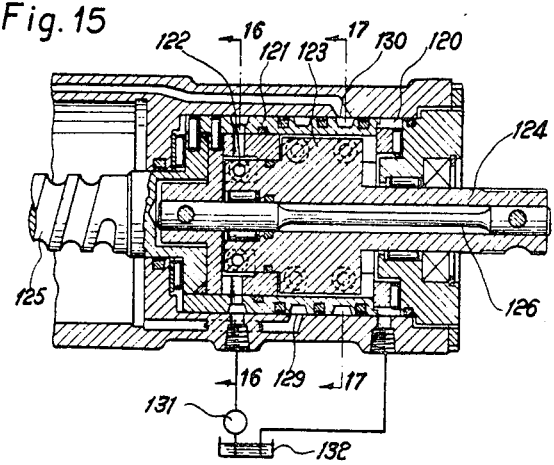
FIG. 15 shows a longitudinal sectional view of another example of the invention, wherein a reaction mechanism due to the difference of effective radius of each flap valve member is provided.
Figure 16:
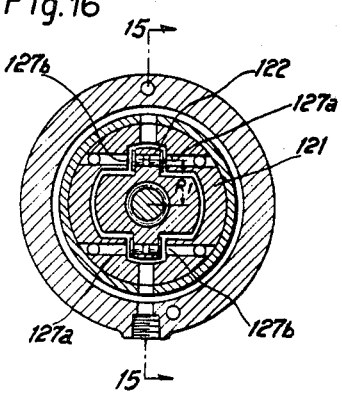
Figure 17:
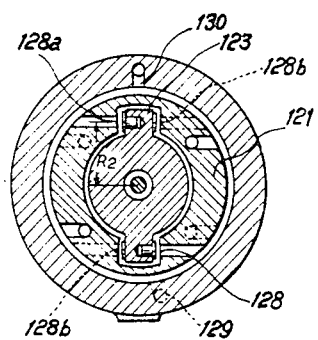
Figure 18:
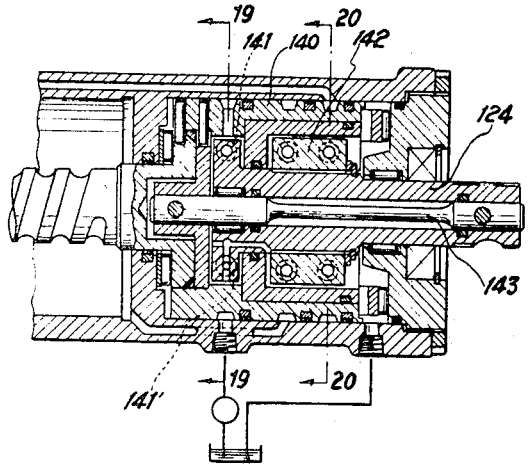
Figure 19:
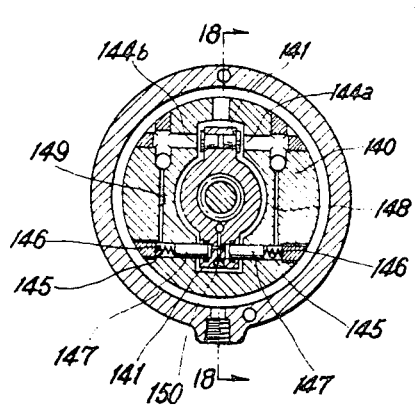
Figure 20:
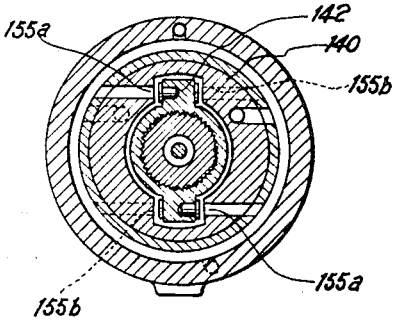
Figure 21:
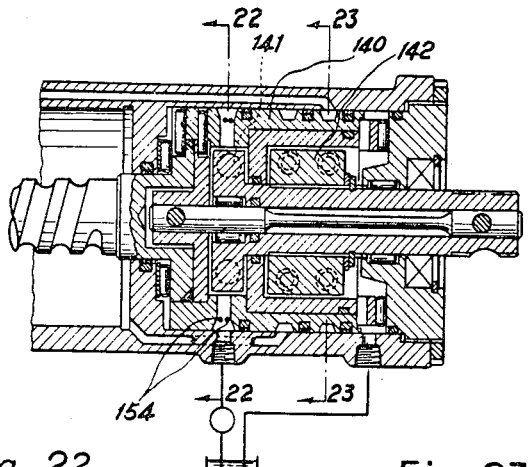
Figure 22:
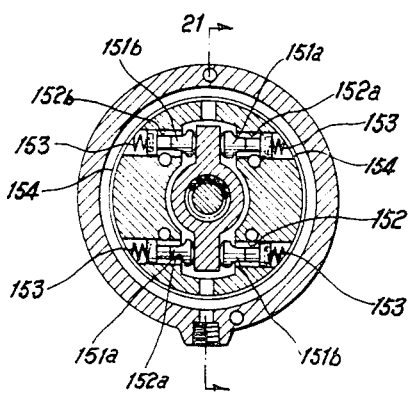
Figure 23:
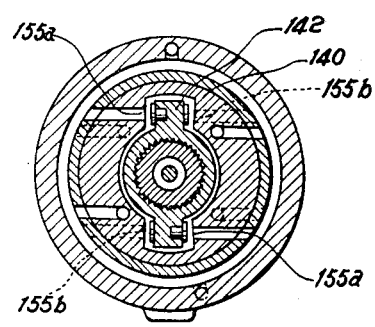
Figure 24:
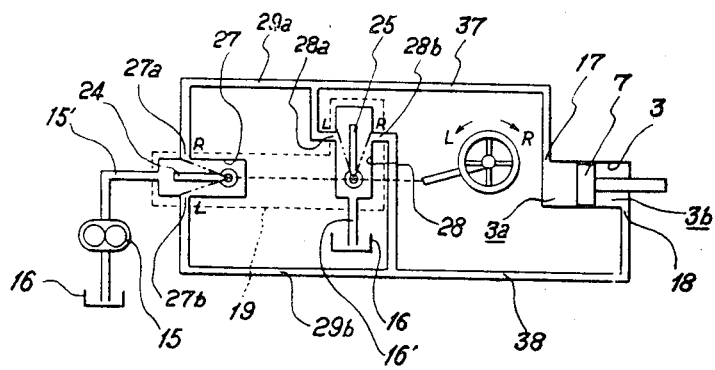

FIGS. 16 and 17 are sectional views along the lines 16—16 and 17—17 of FIG. 15 respectively;

FIG. 18 shows a longitudinal sectional view of another example of the invention, wherein another type of reaction mechanism is utilized;

FIGS. 19 and 20 are sectional views along the lines 19—19 and 20—20 of FIG. 18 respectively;

FIG. 21 shows a longitudinal sectional view of another example of the invention, wherein a further different type of reaction mechanism is utilized;

FIGS. 22 and 23 are sectional views along the lines 22—22 and 23—23 of FIG. 21 respectively;

FIG. 24 is a schematic drawing showing systematically the principle of operations in the servo valve device according to the present invention.

Now, a first embodiment of the present invention will be explained with reference to FIGS. 1, 2, 3 and 4.

In FIG. 1, 1 represents a body of a power steering gear. This body 1 comprises a cylinder 3 of the fluid pressure motor on the one side of a separating wall 2, and on the other side thereof a housing 4 for a control valve. An end of the cylinder 3 is closed tightly by a cover 5 and a fixing ring 6, and a piston 7 is inserted slidably in the cylinder 3, whereby a piston-left chamber 3a and a piston-right chamber 3b are defined. On the outer periphery of the piston 7 a rack 7a is provided parallel to the piston axis with which is engaged a sector toothed wheel 8a provided on one end of a steering gear shaft 8 supported rotatably on the body 1. The other end of said steering gear shaft 8 (not shown) is connected with the front wheels of an automobile through the intermediary of a linkage comprising a rocking arm, a connecting lever, etc. and the steering torque is transmitted to this shaft 8. The piston 7 is perforated along its center axis, and one end of this perforation 9 is closed by a plug 10. On the inner periphery of said perforation 9 is provided a spiral groove 9a of semi-circular section. On the outer surface of a steering rod 11 is provided a mating spiral groove 11a adapted to form a spiral groove of circular section in combination with said spiral semi-circular groove 9a. A plurality of balls 12 are continuously inserted in said spiral groove of circular section 11a, and a reversing conduit 13 for balls 12 is provided on the outer periphery of the piston 7. Thus, a ball-screw mechanism is constructed, and the piston 7 and the steering rod 11 are engaged in the manner of a screw. The steering rod 11 penetrates the separating wall 2 of the body 1, and its end projects into the housing 4 and is supported rotatably therein by a bearing 14. On the valve housing 4, there are provided a supply port 15 and an exhaust port 16 for a pressure fluid with a suitable axial spacing therebetween.

Moreover, there are provided operative ports 17 and 18 for supplying and exhausting pressure fluid, respectively, the ports 17 and 18 opening on the inner periphery of the housing 4, said operative ports 17 and 18 being connected through conduits 37 and 38 with piston-left chamber 3a and piston-right chamber 3b. Further, a main valve member 19 is rotatably inserted within the inner periphery of the housing 4, and said main valve member 19 is connected with the end of the steering rod 11 by means of a fixing pin 20.

On the outer periphery of the main valve member 19, annular grooves 21, 22 and 23 are provided respectively opposite the supply port 15 and the operative ports 17 and 18, so that the pressure fluid can be always supplied at any rotational position of the main valve member 19.

On both sides of said annular grooves 22 and 23, there are provided rotary sealing members. The inside of the main valve member 19 is hollow, and the resulting hollow space A is separated by an intermediate sealing wall 26 into two valve chambers 27 and 28, wherein a first flap valve 24' and a second flap valve 25' are housed respectively in such manner that said both flap valves can be allowed to rotate relatively to each other. In the valve chamber 27, a valve member 24 having the radially projecting first flap valve 24' is housed, and in the other valve chamber 28, the second flap valve 25' projecting radially from the steering rod 25 is housed, said both flap valves being allowed to make their respective rocking motions. The steering rod 25 provided with the second flap valve 25' is supported by a bearing 31 housed within a sealing member 30 which is fixed in the opening of the valve housing 4, and said bearing 31 is sealed by a sealing member 32. The end of said steering rod 25 is connected by suitable coupling device (not shown) with the steering shaft and wheel so as to be operated by the driver.

The steering rod 25 provided with the second flap valve 25', the valve member 24 having the first flap valve 24' and the steering rod 11 connected with the main valve member 19 are flexibly connected to one another by means of a double torsion bar 33. This bar 33 is constituted of a first resilient portion 33a of smaller diameter having lower spring constant and a second resilient portion 33b of larger diameter having a higher spring constant than that of the first resilient portion. The first resilient portion 33a of said double torsion bar 33 is fixed at its end to a coupling member 39 by a pin 34, and said coupling member 39 is fixed to the main valve member 19 by a pin 20'. The second resilient portion 33b is fixed at its end to the steering rod 25 by a pin 35, and the central portion between the first and second resilient portions is fixed by a pin 36 to the first flap valve member 24. Therefore, when the steering torque is applied to the steering rod 25, the first resilient portion 33a having the lower spring constant of the bar 33 is first twisted, and the first flap valve 24' is displaced angularly relative to the main valve member 19 until said valve 24' abuts against the wall of the valve chamber 27, and then the second resilient portion 33b is twisted, and the second flap valve 25' is displaced angularly relative to the first flap valve 24'. As is shown in FIG. 2, the valve chamber 27 which houses the first flap valve 24' is connected with the annular groove 21, and is provided with pairs of distributing ports 27a and 27b opposite each side of the first flap valve 24' respectively, a predetermined gap being maintained between projecting valve seat 24'' provided on each side of the first flap valve and said each distributing port.

As is shown in FIGS. 3 and 4, the valve chamber 28 which houses the second flap valve 25' is provided with pairs of injection ports 28a and 28b opposite to a side of the second flap valve 25', and said injection ports 28a and 28b are connected to the annular grooves 22 and 23 respectively. A predetermined gap between a projecting valve seat 25'' provided on each side of the second flap valve 25' and said each injection port is maintained as somewhat larger than the above-mentioned gap for the first flap valve 24'. Moreover, the valve chamber 28 is connected to the exhaust opening 16 provided on the housing 4 through the end opening of the main valve member 19. The distributing ports 27a and 27b are, respectively by means of oil conduits 29a and 29b provided parallel to the axis of and in the main valve member 19, connected with the annular grooves 22 and 23. The supply port 15 is connected with the delivery of a fluid pressure pump 40 through a supply pipe 15', and the fluid under high pressure is supplied therethrough. The exhaust port 16 is led to an oil reservoir 41 by an exhaust pipe 16'. A pump 40 is driven by a driving source 42, the driving power being supplied from the engine shaft of the automobile. A relief valve 43 is provided for controlling the delivery pressure of the pump 40 under the predetermined pressure.

The operation of the servo valve device according to the present invention is explained as follows:

By starting the supply pump 40, pressure oil is supplied from supply port 15 into the valve housing 4, and through annular groove 21 into the valve chamber 27, and further introduced by means of distributing ports 27a, 27b and oil conduits 29a, 29b into operative ports 17, 18 of cylinder 3 as well as injection ports 28a, 28b. In the neutral positions of the first and second flap valves 24', 25', the flow resistance at each distributing port and each injection port is equal, and the majority of supplied oil is delivered to oil reservoir 41 via injection ports 28a, 28b and exhaust port 16. Accordingly, the oil pressures in the piston-left chamber 3a and in the piston-right chamber 3b cannot rise and are maintained in equilibrium, whereby the piston 7 cannot move. In this state, if the steering wheel is turned clockwise, the first resilient portion 33a of small diameter of the double torsion bar 33 is twisted, and the first flap valve 24', together with the steering rod 25, is rotated clockwise relative to the main valve member 19, because the ground resistance of the front wheels is working on the steering rod 11. The distributing ports 27a are open until said flap valve abuts against the wall of the valve chamber 27, and then, the second resilient portion 33b of larger diameter of the double torsion bar 33 is twisted, and the second flap valve 25' is rotated clockwise relative to the first flap valve 24' in such manner that the injection ports 28b are closed and the injection ports 28a are opened. Therefore, the greater part of the pressure oil supplied by the pump 40 is distributed by the first flap valve 24' to the distributing ports 27b, and through the annular groove 23 to the distributing ports 28b. But, said ports 28b are now restricted by the second flap valve 25', and the quantity of pressure oil flowing to the exhaust is greatly limited thereby.

Thus, the pressure oil is introduced from said groove 23 to the piston-right chamber 3b through the operative port 18, whereby the piston 7 is displaced leftwards, and the oil exhausted from the piston-left chamber 3a is led through the operative port 17 and the injection ports 28a where the flowing resistance is low, to the oil reservoir 41.

Thus, a small steering torque given by the operator is increased by the piston 7, and the steering to the right of the front wheels of the vehicle is effected. In this state, as the right side of the top and the left side of the bottom of the first flat valve 24' is abutted against the wall of valve chamber of the main valve member 19, the clockwise oil pressure force due to the unbalanced pressure on the both sides of the first flap valve 24' is very low, and only the counter clock-wise oil pressure force due to the injecting flow acting against the second flap valve 25' is perceived as a steering reaction. While the operator continues to rotate the steering wheel clockwise, the first and second flap valves 24', 25' work respectively so as to close the distributing ports 27a and the injection ports 28b, and in this state, the main valve member 19 and the steering rod 11 continue to rotate clockwise following the rotating steering rod 25, whereby the front wheels of the vehicle are increasingly steered to the right and a suitable steering reaction is obtained as mentioned above. In this case, the steering resistance is increased in proportion to the steering angle of the wheels, whereby the pressure in the cylinder 3 is also proportionally elevated and a desired steering reaction proportional to the angular displacement of the steering wheel is obtained. When the operator, in taking hold of the steering wheel, stops the operation of the steering wheel, the front wheels of the vehicle maintain their steering conditions, whereas if the operator releases the grip of said steering wheel, the steering rod 25 is rotated reversely (leftward rotation) by accumulated torque of the double torsion bar 33. Thus, the relative positions of the flap valves 24', 25' to the main valve member 19 return to their respective initial neutral positions, and the injection port 28b are opened, and thereby the pressures in the piston-left chamber 3a and the piston-right chamber 3b are balanced, and the front wheels of the vehicle return to their initial positions by their self-returning action.

In the case of counterclockwise steering, the pressure oil is, contrary to the above, supplied into the piston-left chamber 3a, and the front wheels of the vehicle are steered to the left and a clockwise oil pressure force acting against the second flap valve 25' is perceived as a steering reaction.

A second embodiment of the present invention is described with reference to FIGS. 5 and 6.

In this embodiment, the means of connection permitting relative rotation of the valve member 24 having the projecting first flap valve 24' and the steering rod 11 connected with the main valve member 19 is different from that of the above-mentioned first embodiment, and is constituted of a pin engaged in a V-groove and a coil spring. The other features are quite analogous. Only the different features are explained as follows.

A torsion bar 44 is provided for connecting the first flap valve 24' and the second flap valve 25' in such manner that said two valves can be rotated relative to the main valve member 19. At an end of this torsion bar 44, towards the steering rod 11, a V-groove 45 is provided diametrically, and a pin 46 is engaged not only with said V-groove, but with a key groove 47a provided longitudinally in a coupling member 47 fixed on the end of the steering rod 11, said pin 46 being pushed against the V-groove 45 by a spring 48 through the intermediary of a support member 49. Accordingly, when the phase of positions of the steering rod 11 connected with the main valve member 19 and of the first flap valve member 24 does not coincide, the pin 46 abuts only against one of the slopes of said V-groove, whereby the restoring energy to the initial position of phase zero is stored, which permits both flap valves 24' and 25' to return to their neutral positions. Of course, as is described about the first resilient portion 33a of the double torsion bar 33 in the first embodiment, said restoring energy is so defined as less than the spring constant of the torsion bar 44 which connects the first flap valve 24' with the second flap valve 25'. Therefore, similarly as explained in the first embodiment, by steering torque applied on the steering rod 25, the first flap valve 24' is first rotated relative to the main valve member 19 to effect its distributing action, and then the torsion bar 44 is twisted to rotate the second flap valve 25' relative to the first flap valve 24' in order to effect the control of the fluid pressure motor, and only the oil pressure acting on the second flap valve 25' is perceived as a steering reaction.

The third embodiment of the invention is described with reference to FIGS. 7 and 8.

In this embodiment, the first flap valve 50 and the second flap valve 51 are made integral with the steering rod 52 so as to operate under the same phase of position, and the steering rod 52 is connected with the steering rod 11 by means of a torsion bar 53. Valve seats 50' are provided which pass through valve body so as to project on both side faces of the first flap valve 50. Said valve seats 50' are supported to be slidable axially, and compression springs 54 are inserted between said valve seats and both side faces of the flap valve 50, whereby the valve seats 50' are maintained in their neutral positions. The first flap valve 50 and the second flap valve 51 are so connected with the main valve member 19 as rotatable relatively in almost the same manner as described in the preceding embodiment. By the steering torque applied on the steering rod 52, the first flap valve 50 is first rotated relative to the main valve member 19 and the steering rod 11, through the intermediary of the torsion bar 53, to effect the distributing action by abutting its valve seats 50′ against the ports on one side, and then, by further twisting of the torsion bar 53, the second flap valve 51 is rotated relatively to close the injection ports on one side, whereby the control of the fluid pressure motor is effected. In this case, as the valve seat 50′ are connected with the first flap valve 50 by means of the spring 54, the oil pressure does not act on the first flap valve 50, and only the oil pressure acting on the second flap valve 51 is perceived as a steering reaction.

In the following, other improved embodiments of the present invention are described.

In FIGS. 9 to 13, there is shown an improved valve device, wherein, the constructions of the main valve member as well as the first and the second flap valves are simplified and improved for the sake of easy manufacture.

In this embodiment, the basic constructions of the valve members are quite analogous to those in the preceding embodiments. Only the different features are described as follows.

On a piston 46 inserted into the fluid pressure cylinder 45, a rack 47 is provided, and on a shaft 49 provided with a sector wheel 48 which engages with said rack 47 is fixed a rocking arm 50. The end of said rocking arm is pivoted on a connecting rod 51, which is connected to the wheels to be steered, through the intermediary of rods 52, 53 and arms 54, 55. A steering rod 58 is engaged with the piston 46 through the intermediary of a series of balls 59, and by relative movement of the steering rod 58 and the piston 46, said balls 59 are sent back through a return passage 60 provided within the steering rod 58 from one end of the screw groove to the other end. At the starting end and the terminal end, a guide member 61 serving to lead balls into said return passage 60 is provided. Thus an endless circulating passage is ensured for these balls. By this arrangement, said return passage 60 is only led to one of the chambers of the cylinder, whereby the leakage of pressure oil is totally avoided.

Moreover, the pressure loss of pressure oil supplied into the cylinder 45 is also avoided, and there is no need of providing a means of sealing on said return passage 60. The steering rod 58 is supported through a separating wall between the fluid pressure cylinder 45 and the control valve housing 62, and one end of the steering rod 58 projects into said housing 62. In the housing 62, the main valve member 64 is rotatably inserted and is engaged with the end of the steering rod 58. The first flap valve 65 and the second flap valve 66, adapted to rotate relative to said main valve member 64 and to control pump-supplied oil, are arranged within respective recesses 67 and 68 provided diametrically on the left and the right side of said main valve member 64 in the housing 62. One of the recesses 67 is connected with a supply port 70 of the housing 62 and becomes a high pressure chamber by introduction of the pump-supplied pressure oil. The other recess 68 is connected with a reservoir 91 through an exhaust port 71 and becomes a low pressure chamber. Moreover, on the central outer periphery of the main valve member 64, annular grooves 74 and 75 are provided respectively opposite to operative ports 72 and 73 of the fluid pressure cylinder 45, said grooves 74 and 75 being sealed therebetween. On both side walls of said recess 67 of the high pressure chamber, as shown in FIG. 10, pairs of distributing ports 77a and 77b open respectively opposite to the first flap valve 65.

On both side walls of said recess 68 of the low pressure chamber, as shown in FIG. 13, pairs of injection ports 78a and 78b open respectively opposite to the second flap valve 66. The distributing port 77a opening on one side of the first flap valve 65 is connected with one of the operative ports 73 of the fluid pressure cylinder 45 by means of a passage 79a opening on the annular groove 75, and also is connected with the injection ports 78a opening on the other side of the second flap valve 66 by the intermediary of a passage 80a. The distributing ports 77b opening on the other side of the first flap valve 65 is connected with the other operative port 72 of the fluid pressure cylinder 45 by means of a passage 81b opening on the annular groove 74, and also is connected with the injection port 78b opening on the one side of the second flap valve 66 by the intermediary of a passage 82b.

The steering rod 58, the first flap valve 65 and the second flap valve 66 are connected with one another as relatively rotatable by means of a double torsion bar 83. An end of a resilient portion of small diameter 83a of the torsion bar 83 is fixed by a pin 85 to a cylindrical member 84, engaged with the end of said steering rod 58, and an end of a resilient portion of large diameter 83b of said bar 83 is fixed by a pin 87 to a steering rod 86, integral with the second flap valve 66, and an intermediate portion of said bar 83 is fixed to the first flap valve 65 by a pin 88.

Thus, similarly as explained in the preceding embodiments, by manual steering rotation of the steering rod 86, the double torsion bar 83 is twisted and the first flap valve 65 is first rotated relative to the main valve member 64 to effect its distributing action, and then, when the first flap valve 65 becomes abutted against the side walls of the recess 67, the second flap valve 66 is further rotated relative to the first flap valve 65 in order to effect the control of the fluid pressure motor, and only the oil pressure acting on the left side or the right side of the second flap valve 66 is perceived as a steering reaction.

An alternative example of FIG. 9 is shown in FIG. 14. This example aims to get the anti-vibration function and the stability of movement of the flap valve members 65 and 66, and for this purpose, a means of generating frictional force is provided between the main valve member 64 and the flap valve member 65 and 66. In the main valve member 64, cylindrical holes 93 opening against inside end surfaces of the first and second flap valves 65 and 66 are bored longitudinally. Into these holes 93, two plungers 94 and 95 are inserted respectively, and by compression springs 96 inserted therebetween, the flap valve members 65 and 66 are pushed outwardly respectively. A small aperture 94a is pierced in the plunger 94 which projects into the high pressure chamber, whereby the high pressure oil in said high pressure chamber is introduced into the back of said plungers 94 and 95. Accordingly, the frictional force generated between the plunger 95 and the second flap valve 66 becomes considerably great in proportion to the high pressure in said high pressure chamber. Thus, by high resistance due to this frictional force against the relative displacements of the flap valves 65 and 66 and the main valve member 64, unstable vibrations of the flap valve members 65 and 66 are avoided, and displacement resistance of the second flap valve 66 is increased in response to the fluid pressure in proportion to the steering angle, whereby the valve characteristics are greatly improved.

Another embodiment of the invention is shown in FIGS. 15, 16 and 17, wherein the effective radius $R_2$ of the second flap valve which controls the flow pressure is made larger than the effective radius $R_1$ of the first flap valve which distributes the pump-supplied oil, said two flap valves being made integral with each other, and by difference of said two effective radii, a suitable steering reaction is obtained.

In this embodiment, a main valve member 121 inserted in a valve housing 120 is fixed to a steering rod 125, and first and second flap valves 122 and 123 rotatable relative to the main valve member 121 are inserted in a hollow chamber of said member 121. A steering rod 124 integral with the flap valves 122, 123 is connected with the steering rod 125 at its one end by a torsion bar 126. As mentioned above, the effective radius $R_2$ of the second flap valve 123 is made larger than the effective radius $R_1$ of the first flap valve 122, and pairs of distributing ports 127a, 127b and a pair of injection ports 128a, 128b are provided respectively opposite to each side of said two flap valves, and similar valve passages as above mentioned are formed and connected respectively with operative ports 129, 130 of the fluid pressure motor. The hollow chamber wherein both flap valves 122, 123 are housed is separated by a sealing member into a high pressure chamber and a low pressure chamber, and the former is supplied by a pump 131 and the latter is led through an exhaust passage to an oil reservoir 132. By manual steering, the flap valves 122, 123 are rotated relatively to the main valve 121, and a circulating valve passage is formed, whereby the fluid pressure motor is operated. During the operation of distribution, a resulting pressure due to pressure difference of the distributing ports 127a and 127b acts on the first flap valve 122, and though this resulting pressure acts in the direction opposite to that of a flowing pressure acting on the second flap valve 123 during its operation, the latter pressure only becomes effective, because the effective radius $R_2$ of the second flap valve 123 is larger. This pressure is, in reality, a reaction torque due to the difference of the effective radii $(R_2-R_1)$ of the flap valves, and by acting in the direction opposite to the steering direction, forms a suitable steering reaction.

Another embodiment of the invention is shown in FIGS. 18, 19 and 20, wherein a first and second flap valves 141, 142 working in the same displacement phase are provided, and in order to balance a pressure resulting from pressure difference of distributing ports 144a and 144b and acting on a first flap valve 141, pressure plungers 147 are provided, and the flow pressure acting on the second flap valve 142 is utilized as steering reaction.

In this embodiment, the basic valve construction is quite analogous to that of the preceding embodiments, and only a means of balancing of the resulting pressure acting on the first flap valve 141 is explained as follows.

First and second flap valves 141, 142, rotatable relative to the main valve member 140 are provided. Both flap valves 141 and 142 are fixed on a steering rod 124 in such manner that said both valves 141 and 142 work in the same rotational phase, and the main valve member 140 and the flap valves 141, 142 are connected by a torsion bar 143 to be relatively rotatable to each other. In the high pressure chamber of the main valve member 140, pairs of distributing ports 144a and 144b are provided, and on opposite sides of the center of rotation of said flap valve 141, a pair of cylindrical holes 145 of almost the same diameters as those of the ports 144a, 144b are provided in symmetrical positions relative to said ports 144a, 144b. In these cylindrical holes 145, plungers 147 are inserted against compression springs 146, and the ends of said plungers 147 are tight inserted into the sides of a projection 141' integral with the flap valve 141. These cylinders are connected with pairs of the distributing ports 144a and 144b by passages 148 and 149, whereby the pressure of said distributing ports is introduced into the backs of said plungers. The end spaces of said plungers 147 sealed from high pressure are connected with the low pressure chamber of the main valve member 140 by a conduit 150.

When the flap valve 141 is relatively rotated and distributing operation is effected, a pressure is generated on one of the plungers 147 which receives pump-supplied oil, and this pressure works as a reverse pressure against the operative pressure acting on the first flap valve in response to the pressure difference of the distributing ports. When both pressures are equal, equilibrium is obtained. Thus, the flow pressure acting on the second flap valve 142 is perceived as a steering reaction. The diameters of the cylindrical holes 145 and the plungers 147 may be selectively decided according to the desired values of steering reaction, and, for example, if large diameter is selected as compared with that of the distributing port, the valve of the steering reaction becomes great, and vice versa.

In another example of the invention shown in FIGS. 22, 23 and 24, a first flap valve 141 and a second flap valve 142 are provided rotatable relative to a main valve member 140. Within the body of main valve member 140, a pair of cylindrical holes 152a, 152b are provided adjacent each side of the first flap valve 141, and into these holes spool members 151a, 151b are slidably inserted. At the back of said spool members, compression springs 153 are inserted and supported by stop rings 154. Thus, the inside ends of said spool members abut against the side surfaces of the first flap valve 141 and move axially in co-operation with the displacement of said first flap valve. Each of the spool members 151a, 151b is provided with a shoulder and a notch, wereby opening and closing of the corresponding distributing ports is effected and the distributing operation of the pump-supplied fluid is performed. As both ends of each spool member always receive the same pressure of the pump-supplied fluid, the pushing power is always in equilibrium. A passage opening at the shoulder of the respective spool members 151a, 151b is connected with pairs of injection ports 155a, 155b opening against the sides of the second flap valve 142. When the distributing ports are opened or closed by the spools 151a, 151b, the flow of the injection ports 155a, 155b is simultaneously restricted by the second flap valve 142, and the same operation as explained in the preceding examples is effected. The flow pressure acting against the second flap valve 142 is perceived as a steering reaction.

In FIG. 24, a basic arrangement of the device common to the above-mentioned various embodiments of the present invention is schematically shown, with respective symbols similar to those used in FIG. 1. In the high pressure chamber 27 connected with the pump 15, the first flap valve 24 is housed, and pairs of distributing ports 27a, 27b opening against the side of the first flap valve are provided. In the low pressure chamber 28 connected with the oil reservoir 16, the second flap valve 25 is housed, and pairs of injection ports 28a, 28b opening against the side of the second flap valve are provided. The high pressure chamber 27 and the low pressure chamber 28 are constructed as integral with the main valve member 19. One of the distributing ports 27a is connected with the injection port 28a and with one of the operative ports 17 of the cylinder 3. The distributing ports 27b are connected with the injection port 28b and with the other operative port 18. Thus when the first flap valve 24 and the second flap valve 25 are displaced relatively, and, for example, the distributing port 27a and the injection port 28b are restricted, the operative port 18 is supplied from the pump 15, and the fluid exhausted from the operative port 17 is led through the injection ports 28a to the reservoir 16, whereby a circulating circuit is completed and the piston 7 is operated. Between the main valve member 19 comprising the high pressure chamber 27 and the low presusre chamber 28 and the first and the second flap valve, there are provided various resilient connecting means as described in the above-mentioned examples of the invention.

What is claimed is:

1. A servo valve device in a power steering device of an automobile comprising a first rotatable steering rod member operatively connected with a fluid pressure motor to supplement manual steering torque, a manually rotatable second steering rod member aligned with said first steering rod member, a resilient connecting means between said two steering rod members including two distinct resilient portions to permit relatively rotations therebetween, two fluid-tight separated valve chambers connected respectively with two operative ports of said fluid pressure motor, a main valve member connected with one of said two steering rod members and provided with distributing ports and injection ports located respectively on the opposite walls within said valve chambers, a first flap valve member connected with said resilient connecting means and adapted for control of flow resistance of said distributing ports within the first valve chamber, a second flap valve member connected with said second steering rod member and adapted for control of flow resistance of said injection ports within the second valve chamber, said control of flow resistance being effected such that the flow resistances of one each of said distributing ports and injection ports are restricted and the other of said injection ports is released to exhaust passage by rotational phase difference between said two flap valve members and said main valve member due to manual steering torque, and thereby a circulating passage for operative fluid entering into one of the operative ports of said fluid pressure motor and leaving the other operative ports thereof to a fluid reservoir is completed so as to supplement the manual steering torque applied to said first steering rod member through said two flap valve members and said main valve member.

2. A servo valve device as claimed in claim 1, wherein one of said two distinct resilient portions of the resilient connecting means between said two steering rod members is constituted by a mechanism comprising a pin engaged in a V-groove provided diametrically at the end of said resilient connecting means and a coil spring supported on the end of the first steering rod so as to permit relative rotation between said two steering rod members, said pin being pushed against the V-groove by said coil spring.

3. A servo valve device as claimed in claim 1, wherein said main valve member has two recesses provided diametrically on its respective side in order to form a high pressure chamber receiving the first flap valve member and a low pressure chamber receiving the second flap valve member respectively within a valve housing.

4. A servo valve device in a power steering device of an automobile comprising a first rotatable steering rod member operatively connected with a fluid pressure motor to supplement manual steering torque, a manually rotatable second steering rod member aligned with said first steering rod member, a resilient connecting means between said two steering rod members to permit relative rotations therebetween, two fluid-tight separated valve chambers connected respectively with two operative ports of said fluid pressure motor, a main valve member connected with one of said two steering rod members and provided with distributing ports and injection ports located respectively on the opposite walls within said valve chambers, a first flap valve member connected with said resilient connecting means and adapted for control of flow resistance of said distributing ports within the first valve chamber, a second flap valve member connected with said second steering rod member and adapted for control of flow resistance of said injection ports within the second valve chamber, said control of flow resistance being effected such that the flow resistances of one each of said distributing ports and injection ports are restricted and the other of said injection ports is released to exhaust passage by rotational phase difference between said two flap valve members and said main valve member due to manual steering torque, at least two cylindrical holes being provided in the body of said main valve member parallel to the axis of rotation thereof, and push plungers having outer ends inserted slidably with compression springs therebetween in said cylindrical holes abutting against said first flap valve member and second flap valve member respectively, said push plungers having inner ends receiving the pressure of operative fluid introduced in a high pressure valve chamber, whereby an effective resistance against relative vibratory displacement between said main valve member and said first and second flap valve members is obtained.

5. A servo valve device in a power steering device of an automobile comprising a first rotatable steering rod member operatively connected with a fluid pressure motor to supplement manual steering torque, a manually rotatable second steering rod member aligned with said first steering rod member, a resilient connecting means between said two steering rod members to permit relative rotations therebetweer., two fluid-tight separated valve chambers connected respectively with two operative ports of said fluid pressure motor, a main valve member connected with one of said two steering rod members and provided with distributing ports and injection ports located respectively on the opposite walls within said valve chambers, a first flap valve member connected with said second steering rod member and adapted for control of flow resistance of said distributing ports within the first valve chamber, a second flap valve member connected with said second steering rod member and adapted for control of flow resistance of said injection ports within the second valve chamber, said control of flow resistance being effected such that the flow resistance of one each of said distributing ports and injection ports are restricted and the other of said injection ports is released to exhaust passage by rotational phase difference between said two flap valve members and said main valve member due to manual steering torque, and thereby a circulating passage for operative fluid entering into one of the operative ports of said fluid pressure motor and leaving the other operative ports thereof to a fluid reservoir is completed so as to supplement the manual steering torque applied to said first steering rod member through said two flap valve members and said main valve member.

6. A servo valve device as claimed in claim 5, wherein the ffective radius of said second flap valve member adapted for control of flow resistance of said injection ports is larger than that of said first flap valve member adapted for distributing operation.

References Cited

UNITED STATES PATENTS

| 2,685,342 | 8/1954 | Lauk | 91—375 |
| 2,988,059 | 6/1961 | Wysong | 91—375 |
| 3,180,233 | 4/1965 | Jaslonsky | 180—79.2 |
| 3,199,414 | 8/1965 | Gray | 91—372 |
| 2,640,322 | 6/1953 | Puerner | 180—79.2 |

PAUL E. MASLOUSKY, *Primary Examiner.*